(12) United States Patent
Starinshak

(10) Patent No.: US 6,966,219 B2
(45) Date of Patent: Nov. 22, 2005

(54) TIRE ANTENNA CONTAINMENT SYSTEM AND METHOD

(75) Inventor: Thomas Walter Starinshak, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/745,304

(22) Filed: Dec. 22, 2003

(65) Prior Publication Data

US 2005/0132789 A1 Jun. 23, 2005

(51) Int. Cl.$^7$ .............................................. E01C 23/00
(52) U.S. Cl. ...................................................... 73/146
(58) Field of Search .............................. 73/146–146.8; 152/152.1; 340/7

(56) References Cited

U.S. PATENT DOCUMENTS

| | | | |
|---|---|---|---|
| 6,581,657 B1 * | 6/2003 | Brown | 152/152.1 |
| 6,772,505 B1 * | 8/2004 | Logan et al. | 152/152.1 |
| 2004/0016487 A1 * | 1/2004 | Johnson et al. | 152/152.1 |
| 2004/0016488 A1 * | 1/2004 | Benedict et al. | 152/152.1 |
| 2004/0021558 A1 * | 2/2004 | Kelly et al. | 340/442 |
| 2004/0140030 A1 * | 7/2004 | Hahn et al. | 152/152.1 |
| 2004/0159383 A1 * | 8/2004 | Adamson et al. | 152/152.1 |

* cited by examiner

*Primary Examiner*—Max Noori
(74) *Attorney, Agent, or Firm*—Richard B. O'Planick

(57) ABSTRACT

An antenna system and method for tire monitoring systems provides a tubular antenna housing composed of suitably flexible material. An antenna is placed within the housing in either a straight configuration or a preferred alternative shape such as sinusoidal. The tubular housing may be straight walled or corrugated for additional flexibility. The electronics package may be provided with opposite ends dimensioned and configured for mating engagement with opposite ends of the antenna tube. Mating engagement between the electronics housing ends and the antenna tube ends secure the antenna tube to the electronics package. Subsequently, the antenna system may be secured by adhesive or other known techniques to the tire inner liner.

16 Claims, 1 Drawing Sheet

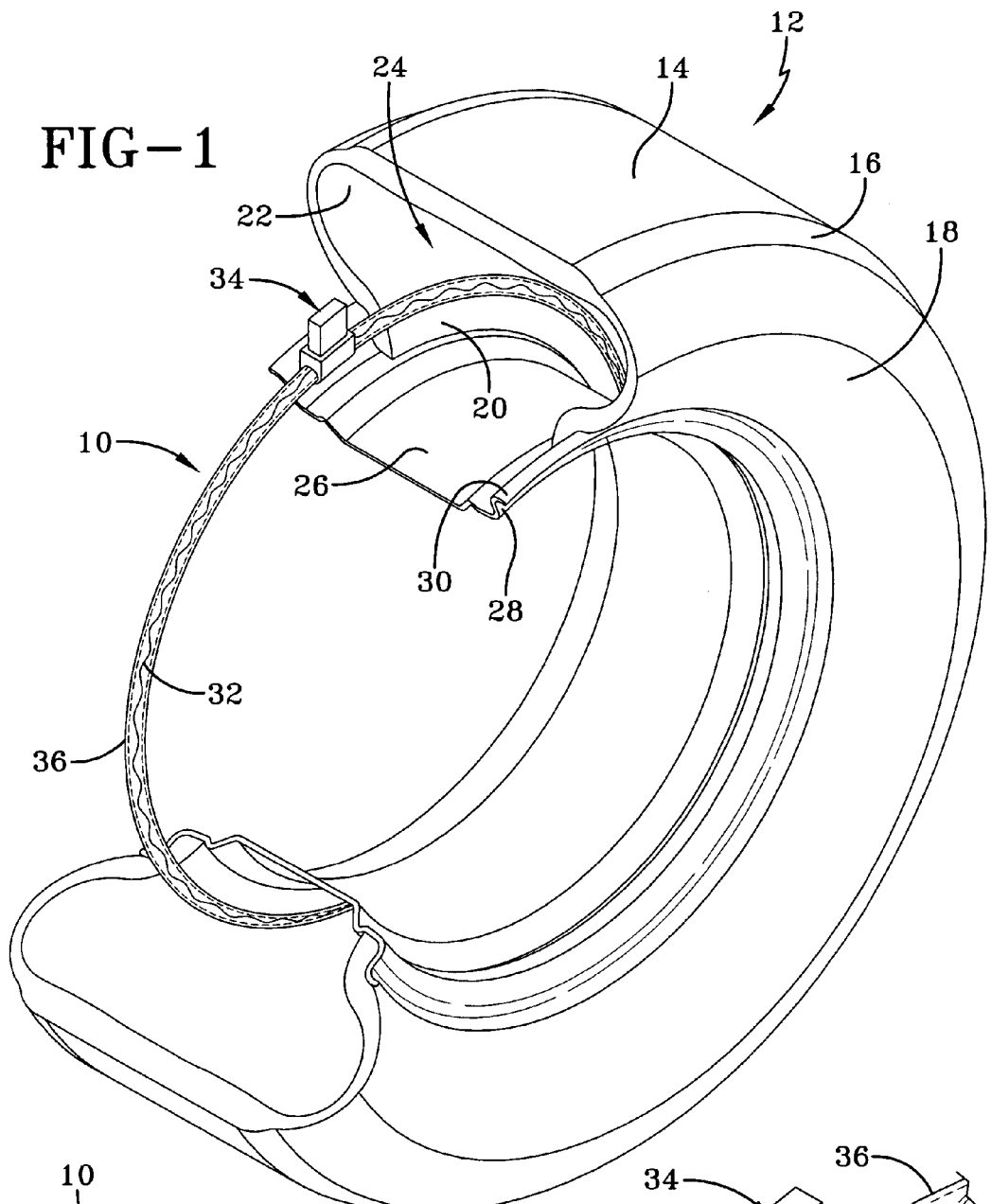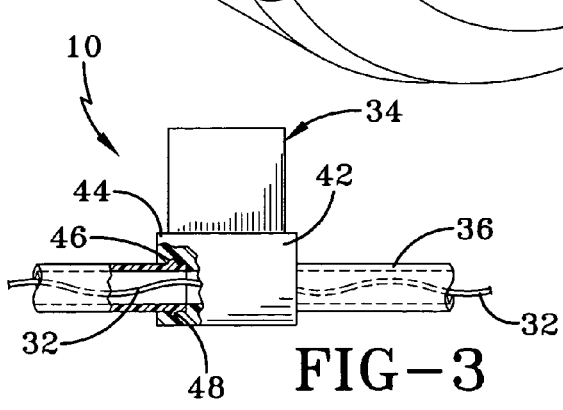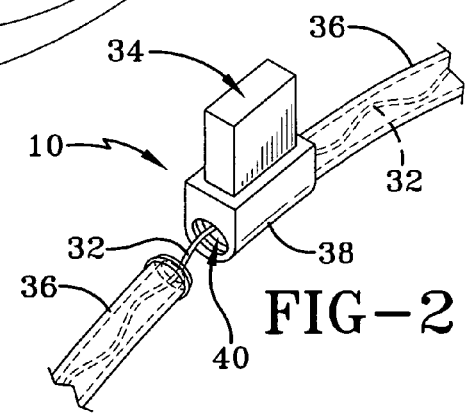

TIRE ANTENNA CONTAINMENT SYSTEM AND METHOD

FIELD OF THE INVENTION

The invention relates generally to an apparatus, including an antenna and a transponder, for a tire pressure monitoring system and, more specifically, to a tire antenna containment system and method for a tire pressure monitoring system.

BACKGROUND OF THE INVENTION

It is common to employ annular apparatus, including an antenna, for electronically transmitting tire or wheel identification or other data at radio frequency. The apparatus includes a radio-frequency transponder comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

It is known in the art to employ an annular antenna to transmit, at radio frequencies, data from a transponder contained within the structure of a tire or tire and wheel assembly. The antenna comprises a wire or strands of wire formed into a loop that may be sheathed in an extruded covering formed from a suitable material such as plastic. The plastic sheath in combination with the antenna form a unitary body that may be affixed to a green tire in a pre-build assembly process or attached to a finished tire in a post-cure operation. While the antenna and transponder may be incorporated into a tire during "pre-cure" manufacture, in practice it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. Any annular antenna and the electronic circuitry associated therewith built into the tire must be able to maintain structural integrity and the mechanical connection between the antenna and transponder package during the diametric enlargement of the tire during its manufacture. Once assembled into the tire, any detected malfunction in the antenna, transponder, or antenna to transponder connection that cannot be repaired destroys the utility of the tire and may necessitate a scrapping of the tire. Hence, placement of an annular antenna-transponder assembly into a tire during its manufacture carries risk that subsequent failure or breakage of assembly components will necessitate the destruction of the otherwise suitable host tire.

Not only is the risk of damage to an annular antenna-transponder system present during its incorporation into a tire during manufacture, but damage to such systems are not uncommon from operation of the tire on a vehicle. Loop antennas and the electronics associated therewith are subjected to substantial compressive strain and at the sidewall a high strain amplitude. Such locations represent high load and deformation to regions of the tire. Consequently, antenna, transponders, and the connections therebetween in such locations are prone to breakage and mechanical or electrical failure.

In order to protect the electronics from undergoing the rigors of a tire cure cycle, it has been proposed that the annular antenna apparatus be applied to a tire in a post-cure operation. The antenna assembly is formed by extruding rubber over an antenna into a specific shape, typically annular, and then the antenna assembly is cured. The antenna, in the cured composite, may then be threaded through an electronic package. Finally, the rubber composite and electronics package is over cured with rubber. The annular antenna assembly may then be glued as a finished unit to the inner side wall of a tire.

While working well, several shortcomings prevent such an antenna assembly and assembly procedure from representing an ideal solution to the needs of the industry. First, sheathing the antenna wire(s) within an elastic sheath, while protecting the antenna, may not allow sufficient freedom of movement in the antenna loop. Such restriction against antenna elongation can cause antenna breakage over time. Secondly, the steps of attaching the electronics package to the antenna wire(s) and over molding the electronics package in a secondary step adds complexity and labor to the antenna apparatus assembly procedure, increasing assembly time and undesirably adding to the cost of the resultant tire.

There is, accordingly, a continuing need for an antenna apparatus and attachment procedure for easily and efficiently incorporating the assembly into a tire. Such a procedure preferably applies the antenna assembly to an electronics package in a post-cure procedure in order to protect the electronics from the rigors of a tire curing cycle. The antenna apparatus must provide sufficient structural integrity to withstand the stresses attendant use in a vehicle-mounted tire and protect the structural integrity of the antenna in such an environment. Moreover, the antenna apparatus ideally will maintain the antenna in its optimal, intended configuration and shape during the tire's life. Since the performance of the tire pressure monitoring system is dependent upon effective communication between the tire electronics and a remote reader via the antenna, maintaining the antenna in an optimal configuration is highly desirable. Additionally, the desired antenna assembly and method of assembly will provide a means for interconnecting the antenna cable an electronics package in a post-cure procedure that is both cost effective and reliable.

SUMMARY OF THE INVENTION

The subject invention overcomes the deficiencies in known antenna systems and methods for tire monitoring systems by providing a tubular antenna housing composed of suitably flexible material. An antenna is placed within the housing in either a straight configuration or, preferably, a sinusoidal, helical, or zigzag shape. The tubular housing may be straight walled or corrugated for additional flexibility. The tubular housing thus serves to protect the antenna from corrosive gases and moisture in the tire cavity while allowing the antenna to flex and extend without restriction. In one aspect of the invention, the electronics package may be provided with opposite ends dimensioned and configure for mating engagement with opposite ends of the antenna tube. The electronics housing ends once mated with ends of the tube secure the attachment of the antenna tube to the electronics package. Subsequently, the antenna system may be glued into or otherwise attached to the tire cavity in conventional fashion. The method of assembly thus includes the steps: positioning an elongate antenna cable into a tubular antenna housing, the housing having a central axial bore open at opposite ends; housing electronics within a package having opposite ends shaped and dimensioned for mating engagement with the tube opposite ends; connecting ends of the antenna cable to the electronics housed within the package; and mateably attaching the package ends to the antenna tube ends to attach the antenna housing to the electronics package.

The advantages of the invention, which will be apparent to those skilled in the art, are achieved by preferred and alternative embodiments that are described in detail below and illustrated by the accompanying drawings.

BRIEF DESCRIPTION OF THE DRAWINGS

FIG. 1 is a perspective view of a tire and the subject annular apparatus with portions of the tire removed for the purpose of illustration.

FIG. 2 is an enlarged partially exploded perspective view of a portion of the antenna tube assembly and the electronics package.

FIG. 3 is a side elevation view thereof shown partially in section for illustration.

DETAILED DESCRIPTION OF THE PREFERRED EMBODIMENTS

A tire pressure monitoring system typically consists of a transponder having one or more sensors. The transponder and associated electronics are housed within a package. In order to send or receive RF signals, a transponder must have an antenna. The antenna is preferably annular in configuration in the subject invention but may have alternative shapes if desired. The antenna may either be incorporated into the tire during manufacture or affixed to the tire by way of a post manufacture procedure. As used herein, an "annular antenna" may be circular, oblong, symmetrical, or asymmetrical without departing from the subject inventive principles. However, the preferred configuration of the antenna is circular and sized to overlap the tire sidewall region to which it attaches. Other locations such as upper side wall or tire crown area are also possible for assembly location. The antenna may comprise a single wire or a plurality of strands. Various commercially available transponders, sensors, and other electrical devices deployed in combination with an annular antenna formed from conventional conductive materials are suitable for use in conformance with the principles of the subject invention.

Acceptable materials for the antenna wire include steel, aluminum, copper, copper alloys or other electrically conducting wire. As disclosed in this patent document, the wire diameter is not generally considered critical for operation as an antenna for a transponder. For durability, stranded steel wire consisting of multiple strands of fine wire is preferred. Other wire options available include ribbon cable, ribbon conductors on fabric strands, flexible circuits, conductive film, conductive rubber, etc.

Referring initially to FIG. 1, a preferred embodiment 10 of the subject invention is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange and an outer rim flange surface 30. Rim 26 is conventionally configured and composed of a suitably strong metal such as steel.

An annular antenna 32 is provided and, in the preferred embodiment, embodies a sinusoidal configuration. Antenna 32 may be alternatively configured into alternative patterns or comprise a straight wire(s) if desired and may be filament wire, or cord or stranded wire. Acceptable materials for the wire include steel, aluminum, copper, copper alloys or other electrically conducting wire. As mentioned previously, the wire diameter is not generally considered critical for operation as an antenna and multiple strands of fine wire is preferred. The curvilinear, or zigzag form of antenna 32 provides flexibility and minimizes the risk of breakage during manufacture and use explained below.

With continued reference to FIG. 1, a transponder module 34 of the general type described above is provided and may include means for sensing tire parameters such as pressure and temperature. Included as part of the apparatus 10 is a containment tube 36 formed preferably but not necessarily into the annular configuration shown. Containment tube 36 is formed of electrically insulating, elastic material as will be described below. In the post manufacturing state, therefore, the apparatus 10 comprising antenna 32, transponder module 34, and containment tube 36, in a unitary, generally circular, assembly that is readily transportable and handled for attachment to tire 12. The diameter of the apparatus assembly 10 is a function of the size of the tire 12 and the preferred attachment location thereon.

In combined reference to FIG. 1, the apparatus 10 is affixed to liner 22 of the tire 12 preferably in a post-manufacture assembly operation. Attachment may be by means of an adhesive or other known conventional means of affixing a device to a rubber composite.

With reference to FIGS. 2 and 3, pursuant to the invention, annular containment tube 36 houses the antenna 32 therein preferably, but not necessarily, in a loose fashion. The tube 36 is composed preferably of elasticized fibers such as Spandex, rubber, vinyl, or may be composed of other material compositions having sufficient flex characteristics. The antenna cable 32 may be either a single wire or a strand of plural wires.

When situated in a tire and subjected to stresses present within the tire, the tube 36 so composed will flex and elongate from an initial relaxed state into an extended state. The wavy, sinusoidal, or zigzag shape of the antenna 32 will straighten and flex within the tube to accommodate the elongation. When released from the influence of tire stress, the tube will recover and contract to the original, optimal, tube shape. The tube 36 may be externally configured having a straight wall or be corrugated for additional flexibility (not shown).

As will be appreciated from FIGS. 2 and 3, the electronics package 34 houses electronics of a type commercially available and in common use. The electronics may include one or more sensors for monitoring the internal tire condition and interconnection means for connecting with the antenna 34. The ends of the antenna 32, for example, may be soldered to terminals within the package 34 to provide means for transmitting input and output signals between the sensor package and an external reader (not shown). The package 34 includes a base housing 38 of generally, but not necessarily, cylindrical configuration having an access axial bore 40 extending therethrough. Bore 40 extends into opposite ends 42, 44 of the housing 38 and represents access to internal electronics housed within housing 34.

The ends 42, 44 of the housing may be configured as protrusions or nipples extending from the housing 38 in one aspect of the invention. Alternatively, the ends 42, 44 may be coplanar with the sides of housing 34 if so desired. The ends 42, 44 represent sockets having a configuration and inner diameter for receiving opposite ends of the tube 36 therein. Alternatively, the ends 42, 44 and tube 36 may be configured such that ends 42, 44 are received within the ends of tube 36. In the embodiment shown, ends of the tube 36 are press fit within the ends 42, 44 of housing 38. Adhesives may be applied to external surfaces of the tube ends to retain the tube in a mating engagement with housing 38. An annular recess 46 may be formed within each housing end 42, 44 positioned to receive a complementary annular shoulder 48 formed to project from each end of the tube 36 if desired. Engagement of the shoulder 48 with the recess 46 mechanically couples the tube to the housing 38.

The method of assembly the tube 36 to housing 38 and electrically connecting antenna 32 to the electronics within housing 34 is thus straight forward and efficient. The method of assembly includes the steps: positioning the elongate antenna cable 32 into the tube 36 preferably in a loose fit, the tube 36 having a central axial bore open at opposite ends; housing electronics within a package 34 having opposite ends 42,44 shaped and dimensioned for mating engagement with the tube opposite ends; connecting ends of the antenna cable 32 to the electronics housed within the package; and mateably attaching the package ends to the antenna tube ends to attach the antenna housing to the electronics package.

From the foregoing, it will be appreciated that the subject invention satisfies the need of the industry for a convenient, reliable method of affixing an antenna in annular form to the inside of a tire. Use of an elasticized textile material, rubber, vinyl, or similar in the formation of the tube 36 creates a containment that protects and maintains the antenna housed therein in an optimal configuration. Tube 36 is economical to produce and highly effective. The tube extends from an initial relaxed state when the stresses within a tire are imposed; the material of the tube and the curvilinear configuration of the antenna accommodating such an elongation. The recovery of the tube to its original form is predictable, and durable enough to withstand the necessary number of elongation/recovery cycles within a typical tire used in an intended manner. LYCRA SPANDEX (registered trademark of E.I. DuPont de Nemours & Company), for example, is one material that may be employed. Other commercially available stretch fabrics may also be utilized. Such fabrics are available having a selection of stretch resistance, stress decay, hysteresis, residual stretch, and recovery characteristics. Materials will generally have a cycle limit, representing the greatest elongation to which the material may be subjected without resulting in a permanent deformation. The holding power and stretch resistance may further be selected to provide an optimum match between the elasticized characteristics of the tube 36 and the magnitude of elongation resulting from stresses a tire environment.

The advantages of the subject invention over antenna apparatus composed of a rubber carrier strip are significant. Spandex fiber, rubber and vinyl tube construction can be stretched repeatedly and still recover to very near original length and strength; the material may be stretched through a high number of cycles without breaking; the material is stronger, more durable and exhibits a higher retractive force.

While the above sets forth a preferred embodiment and alternative embodiments of the subject invention, the invention is not intended to be so limited. Other embodiments that will be apparent to those skilled in the art and which utilize the teachings herein set forth, are intended to be within the scope and spirit of the present invention.

What is claimed is:

1. An apparatus for a tire comprising:
   an elongate antenna;
   an elongate tubular antenna housing composed of suitably flexible material and having an axial bore loosely receiving the elongate antenna therein and extending between opposite antenna housing ends;
   an electronics package having outward ends dimensioned and configured for mating engagement with opposite antenna housing ends, whereby attaching the antenna housing to the electronics package.

2. An apparatus according to claim 1 wherein the antenna has a non-linear configuration.

3. An apparatus according to claim 1 wherein antenna housing includes a substantially straight walled external segment.

4. An apparatus according to claim 1 wherein the antenna housing includes a substantially corrugated wall external segment.

5. An apparatus according to claim 1 wherein the antenna is loosely contained surrounded by air within the antenna housing axial bore.

6. An apparatus according to claim 1 wherein the electronics package ends include retention means for engaging the antenna housing ends.

7. An apparatus according to claim 6 wherein the retention means comprises at least one shoulder engaging an inner wall of the antenna housing within the axial bore.

8. A tire having an antenna assembly incorporated therein, the tire comprising:
   a tire body having an inward facing wall;
   an elongate antenna;
   an elongate tubular antenna housing attached to the tire body inward wall, the antenna housing being composed of flexible material and having an axial bore loosely receiving the elongate antenna and extending between opposite antenna housing end openings;
   an electronics package having outward opposite ends for mating engagement with opposite antenna housing ends respectively, whereby attaching the antenna housing to the electronics package.

9. A tire according to claim 8 wherein the antenna has a non-linear configuration.

10. A tire according to claim 8 wherein the antenna housing includes a substantially straight walled external segment.

11. A tire according to claim 8 wherein the antenna housing includes a substantially corrugated wall external segment.

12. A tire according to claim 8 wherein the antenna is loosely contained within the antenna housing axial bore surrounded by air.

13. A tire according to claim 8 wherein the electronics package ends include retention means for engaging the antenna housing ends.

14. A method for mounting an annular antenna and transponder to a tire, comprising the steps:

providing an elongate antenna having opposite ends;

housing the antenna loosely within an axial bore of an elongate tubular antenna housing, the axial bore terminating at opposite antenna housing ends;

terminating the opposite ends of the antenna to electronics housed with a housing having opposite ends;

placing the electronics package ends into mating engagement with the opposite antenna housing ends to affix the antenna housing to the electronics package housing.

15. A method of assembly according to claim 14 further comprising the step of forming the antenna into a non-linear configuration.

16. A method of assembly according to claim 14 further comprising the step of forming the antenna and the antenna housing into an annular configuration.

* * * * *